United States Patent [19]
Andersson et al.

[11] 3,878,908
[45] Apr. 22, 1975

[54] MEANS FOR MEASURING THE AXLE LOAD IN VEHICLES

[75] Inventors: Leif Andersson; Lars-Erik Lindbäck, both of Vasteras, Sweden

[73] Assignee: Allmanna Svenska Elektriska Aktiebolaget, Vasteras, Sweden

[22] Filed: Mar. 5, 1974

[21] Appl. No.: 448,369

[52] U.S. Cl. ............................ 177/136; 177/211
[51] Int. Cl. ..................... G01g 19/08; G01g 3/14
[58] Field of Search ........................ 177/136, 211

[56] References Cited
UNITED STATES PATENTS

| | | |
|---|---|---|
| 3,194,058 | 7/1965 | Kurkjian .......................... 177/136 X |
| 3,283,838 | 11/1966 | Fetterman et al. .............. 177/136 X |
| 3,443,652 | 5/1969 | Videon ............................... 177/136 |
| 3,650,340 | 3/1972 | Bradley ............................. 177/136 |
| 3,734,216 | 5/1973 | Nordstrom et al. ............. 177/211 X |
| 3,800,895 | 4/1974 | Gale et al. ........................ 177/136 |

Primary Examiner—George H. Miller, Jr.

[57] ABSTRACT

For measuring the axle load in a stationary axle of a vehicle, strain sensing transducers are arranged in mechanical contact with the axle in an area between the wheel bearings and attachments for the load-transferring members. When the vehicle is equipped with brakes, the transducers are placed on opposite sides of a member for transmitting the braking torque which is connected to the axle.

4 Claims, 3 Drawing Figures

MEANS FOR MEASURING THE AXLE LOAD IN VEHICLES

BACKGROUND OF THE INVENTION

1. Field of the Invention

The present invention relates to a means for measuring the load which is applied to the wheels of a vehicle through its wheel axles without the measuring being affected by any fundamental sources of error. The problem of measuring the wheel load or axle load has arisen because of the increasingly stricter view of the authorities with respect to exceeding the highest permissible axle load of the road system.

2. The Prior Art

Measuring systems for this purpose known up to now, which are based on measuring of spring action, measuring of bending moment in wheel axles and measuring of hydraulic pressure in tipping cylinders, have all certain fundamental and unavoidable error sources. When measuring the spring action the friction in the springs causes undefinable errors. When measuring the bending moment in the axle the errors are due to the fact that the bending moment in the axle, for constant load, will be dependent on the position of the resultant reaction force between the roadway and the tires, which can shift with tire pressure and roadway condition. When measuring the hydraulic pressure in tipping cylinders errors are caused by the fact that the distribution of load can deviate from the distribution at the time of calibration.

SUMMARY OF THE INVENTION

According to the present invention the wheel load is measured with the help of shear strain sensing transducers, the transducers being arranged in mechanical contact with the axle in an area between the wheel bearing and the attachment for the load-carrying springs. The expression "axle" here refers to the fixed cover which normally surrounds a driving shaft and which carries the load or, in the case of nondriving wheels, the beam or axle bar in which the wheel is journalled.

By measuring the shearing force in the axle between the wheel bearing and the spring attachment, correct information is obtained regarding the load to which the wheel is subjected. That this information is fundamentally correct is due to the fact that this shearing force is a function of the load only and, in principle, independent of the location of the wheel reaction force resultant.

The shearing force is measured by measuring the main strains associated with the shear strain, which are oriented at an angle of 45° to the longitudinal direction of the axle. The transducer is placed either on the axle surface or in a cavity made for this purpose in the flank of the axle, preferably in the neutral plane of the axle beam.

BRIEF DESCRIPTION OF THE DRAWINGS

The invention will be further described with the help of the accompanying three figures, of which

DESCRIPTION OF THE PREFERRED EMBODIMENTS

Figure 1:
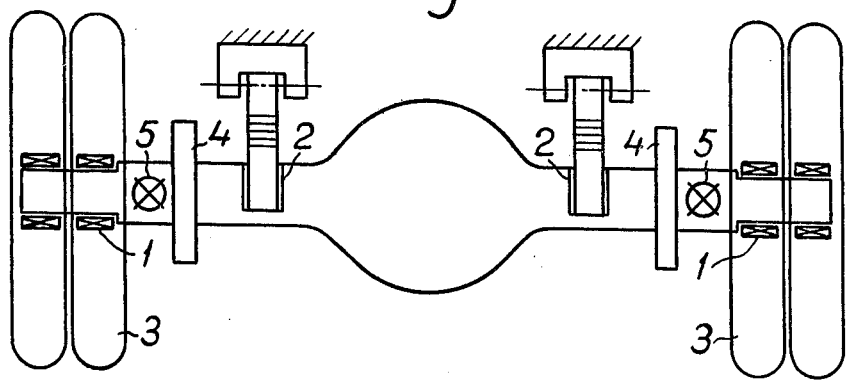
FIG. 1 is a front view of an axle of a vehicle.

The wheels 3 are journalled on the axle by means of the bearings 1. The load-carrying springs are attached to the axle by means of attachments 2. A ring 4 or similar fixture welded to the axle acts as an attachment means for the brake blocks.

The shear strains, and thus the main strains, are changed if the axle is subjected to torsion, which will be the case if the wheel brake is applied while the vehicle is standing on an incline. A torque is then applied through the brake block holder 4. To avoid measuring errors due to the braking-torque, transducers may be applied in either of the following ways.

A transducer 5 measuring the main strains is positioned between the wheel bearing 1 and the brake block holder 4. Since no torsional stresses due to braking arise in this position, the transducer will not be affected by such stresses.

Figure 2:
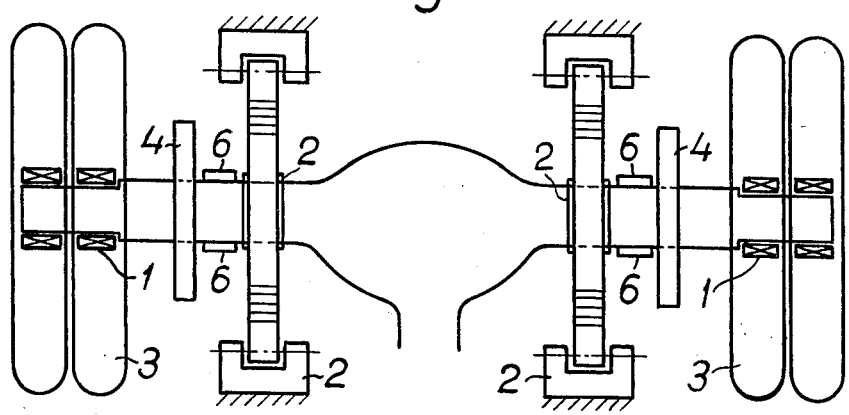
FIG. 2 is a top view showing the use of four transducers and FIG. 3 is a top view showing the use of only two tranducers.

According to another alternative (FIG. 2), transducers 6 measuring the main strains are positioned on both flanks of the axle, in other words one transducer in front of the axle and one at the back of the axle. One of the two cooperating transducers will then sense a decreased shear strain because of the torque, whereas the other transducer will sense a correspondingly increased strain. If the output signals of the transducers are added the changes will cancel each other.

Figure 3:
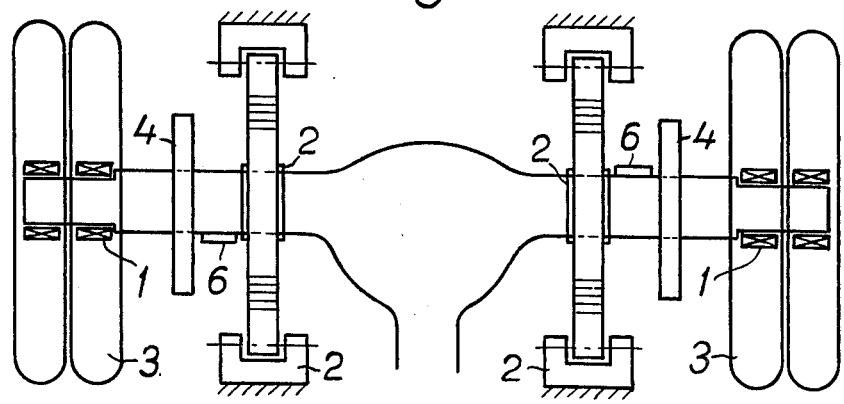

The last-mentioned way of arranging the transducers thus implies two transducers for each wheel. The number of transducers can however be reduced to one for each wheel as shown in FIG. 3 by placing the transducer on the front flank of the axle at one side and on the back flank at the other, presupposing that both wheels are always subject to the same braking-torque.

The tranducers are attached to the axle by screwing or, preferably, by welding. Alternatively a circular hole can be drilled into the axle flank and a cylindrical or conical transducer can be pressed in, so that the transducer is in perfect mechanical contact with axle. The transducer may also consist of a pair of resistance strain gauges which are bonded to the axle.

We claim:

1. In a vehicle having a stationary axle, having a wheel bearing (1) at each end, an attachment (2) for a load transferring member between the wheel bearing and the midpoint of the axle and a torque-transferring member (4) attached to the axle for transferring a braking torque thereto, said torque-transferring member (4) being positioned between the load-transferring member (2) and the wheel bearing (1), means for measuring strains in the axle comprising strain sensing transducer means (5) arranged in mechanical contact with the axle on a part of the axle situated between the wheel bearing and said torque-transferring member (4) and including means to measure the shearing forces in the axle by measuring the main strains oriented at an angle of 45° to the longitudinal direction of the axle associated with the shear strain.

2. In a vehicle having a stationary axle, having a wheel bearing (1) at each end, an attachment (2) for a load transferring member between the wheel bearing and the midpoint of the axle, and a torque-transferring member (4) attached to the axle for transferring a braking torque thereto, said torque-transferring member being positioned between the load-transferring member (2) and the wheel bearing, means for measuring strains in the axle comprising strain sensing transducer means (6) arranged in mechanical contact with the axle situated between said torque-transferring member (4) and said load-transferring member (2) and including means to measure the shearing forces in the axle by measuring the main strains oriented at an angle of 45° to the longitudinal direction of the axle associated with shear strain, and to deliver a signal depending on said main strains, said transducer means comprising at least one transducer arranged on the front side of the axle and at least one transducer on the rear side of the axle, the output signals from said transducers being added in such a manner that the torque-dependent signals are eliminated.

3. In a vehicle as claimed in claim 2, said transducer means including for each end of the axle one transducer located on the front side and one transducer on the rear side of the axle.

4. In a vehicle as claimed in claim 2, said transducer means including for one end of the axle a transducer on its front side and for the other end of the axle a transducer on its rear side.

* * * * *